(12) United States Patent
Horn et al.

(10) Patent No.: US 8,739,642 B2
(45) Date of Patent: Jun. 3, 2014

(54) SENSOR ASSEMBLY

(75) Inventors: Jacob K. Horn, Allen Park, MI (US); Timothy P. Mrosewske, Berkley, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 435 days.

(21) Appl. No.: 12/947,243

(22) Filed: Nov. 16, 2010

(65) Prior Publication Data

US 2012/0118086 A1     May 17, 2012

(51) Int. Cl.
*G01D 11/24*     (2006.01)

(52) U.S. Cl.
USPC ............... 73/866.5; 374/E1.019; 374/E1.018

(58) Field of Classification Search
CPC .................................................. G01D 11/245
USPC ........................................................ 73/866.5
See application file for complete search history.

(56) References Cited

U.S. PATENT DOCUMENTS

| | | | |
|---|---|---|---|
| 4,595,487 A * | 6/1986 | Nunlist | 204/433 |
| 4,640,478 A | 2/1987 | Leigh-Monstevens | |
| 5,764,130 A | 6/1998 | Straub et al. | |
| 6,143,983 A | 11/2000 | Burton et al. | |
| 6,500,322 B2 * | 12/2002 | Akatsuka et al. | 204/427 |
| 2005/0155408 A1 * | 7/2005 | Weyl et al. | 73/23.31 |
| 2005/0193809 A1 * | 9/2005 | Matsumura et al. | 73/118.2 |
| 2005/0229727 A1 * | 10/2005 | Caderas | 73/866.5 |
| 2008/0114523 A1 | 5/2008 | Dugas et al. | |
| 2008/0205806 A1 | 8/2008 | Clark | |
| 2008/0223171 A1 | 9/2008 | Fujiwara et al. | |

* cited by examiner

*Primary Examiner* — Hezron E Williams
*Assistant Examiner* — Nashmiya Fayyaz
(74) *Attorney, Agent, or Firm* — Ralph E. Smith

(57) ABSTRACT

A sensor assembly includes a sensor and a sensor housing that supports the sensor and that operably engages a connector. The sensor housing includes a first retainer and a second retainer. The first retainer includes a tapered surface that tapers relative to the longitudinal axis, and the tapered surface abuts against the aperture surface of the connector to guide the sensor housing as the sensor housing moves substantially parallel to the longitudinal axis into the aperture. The sensor housing is engageable with the connector to receive the connector between the first retainer and the second retainer and to limit relative movement of the sensor housing and the connector in a direction substantially parallel to the longitudinal axis. The second retainer abuts against the aperture surface of the connector to limit relative rotation of the sensor housing and the connector about the longitudinal axis.

18 Claims, 5 Drawing Sheets

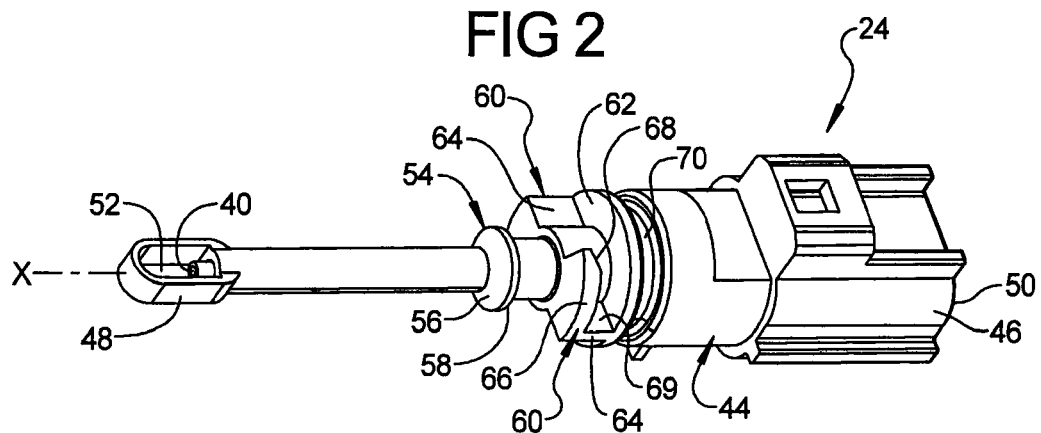
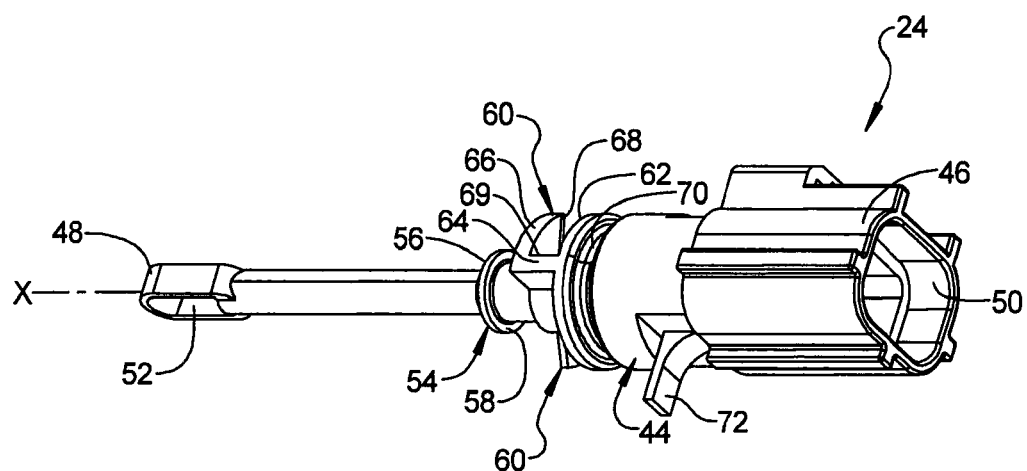

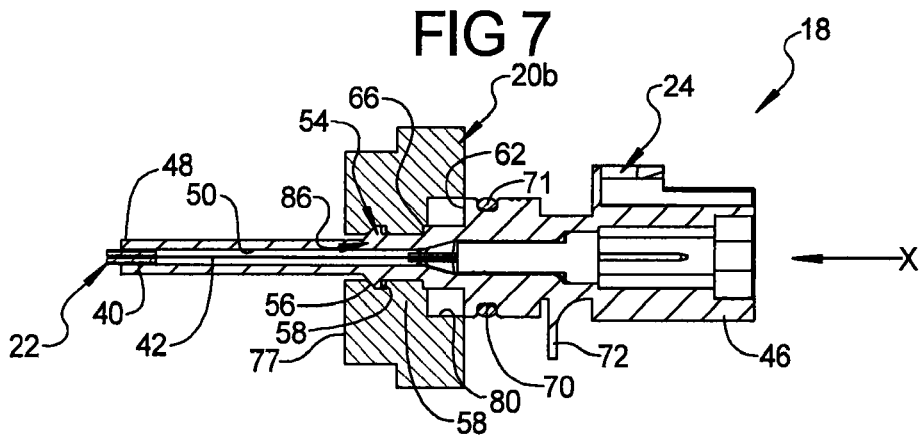
FIG 7
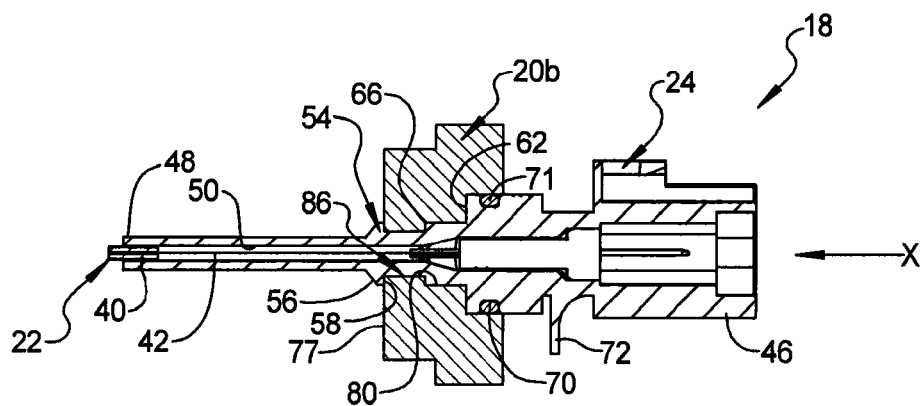
FIG 8
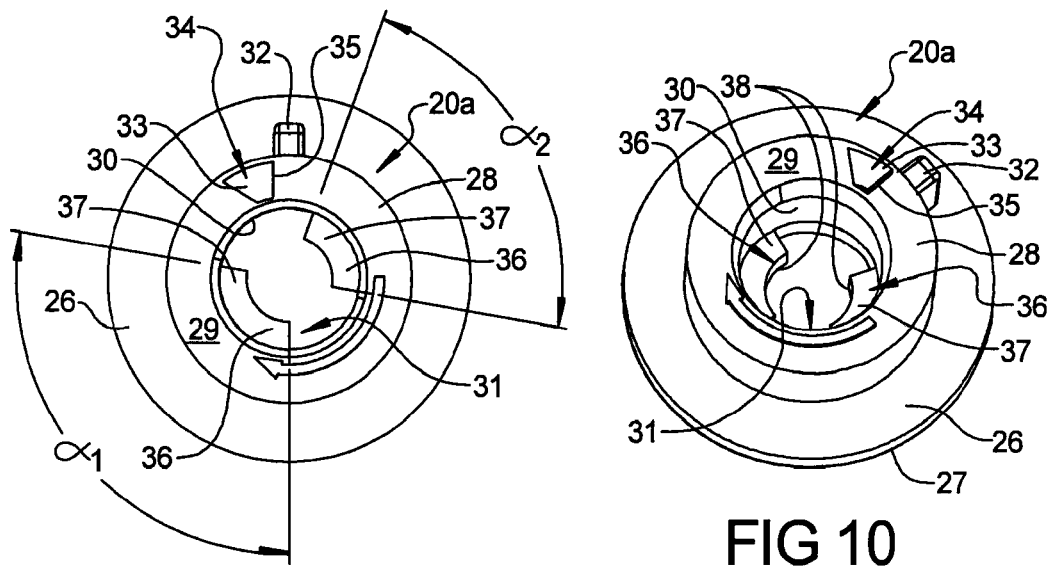
FIG 9
FIG 10

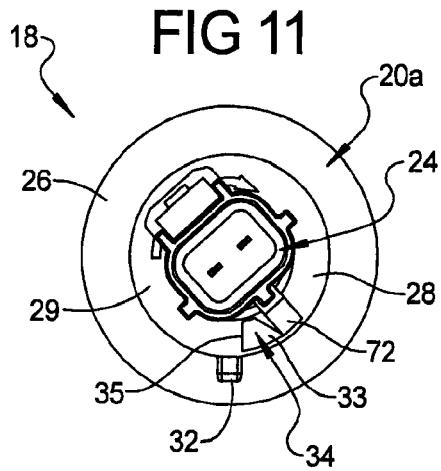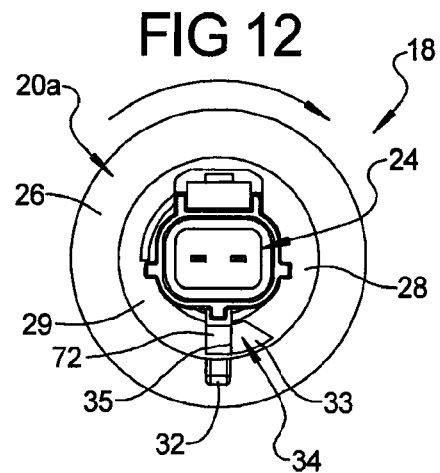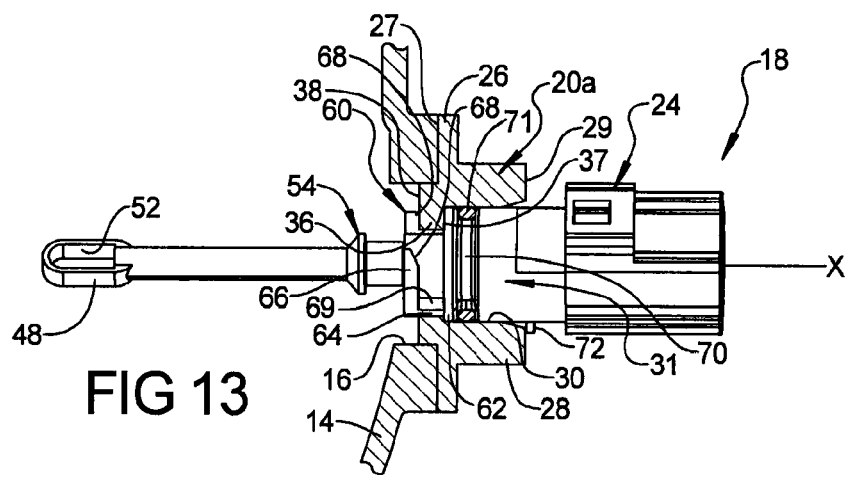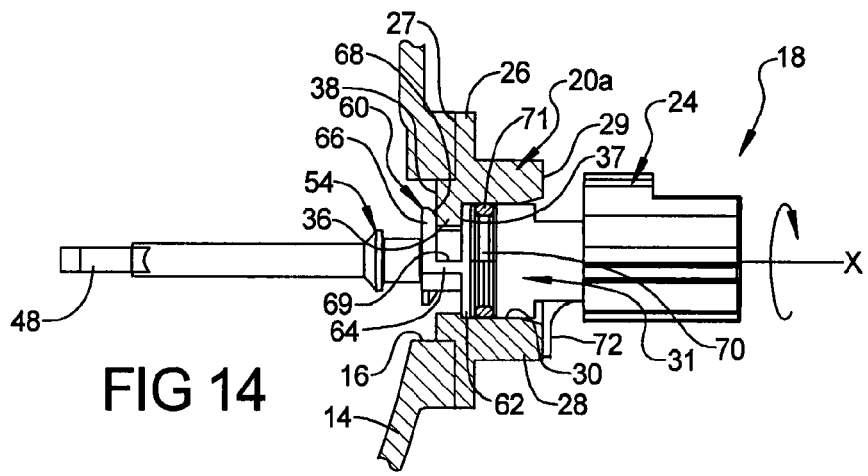

SENSOR ASSEMBLY

FIELD

The following relates to a sensor assembly and, more particularly, relates to a sensor assembly for detecting a characteristic of a substance in a cavity of an object.

BACKGROUND

Sensors can be used for detecting various characteristics. For instance, vehicles can include temperature sensors, air-flow sensors, pressure sensors and various other sensors for detecting temperature, air-flow rate, pressure, and other characteristics for maintaining proper function of the vehicle.

In order to function properly, these sensors generally are installed in a specific orientation. For instance, in the case of a temperature sensor intended to detect temperature of a fluid flowing within a pipe, the sensor can be fixed to the pipe and oriented normal to the flow path of the fluid. If the sensor is offset from this position (e.g., at an acute angle relative to the flow path), the sensor might inaccurately detect the fluid temperature, thereby potentially causing malfunction of a component/system.

However, some sensors may not be securely coupled, and the orientation of the sensor may change over time. Moreover, installing the sensor and ensuring that the sensor is initially oriented correctly may be difficult and/or time consuming.

SUMMARY

A sensor assembly for detecting a characteristic of a substance in a cavity of an object is disclosed. The object includes a side wall that defines the cavity. The object also includes a connector with an aperture providing access into the cavity. The aperture is defined by an aperture surface of the connector. The sensor assembly includes a sensor that detects the characteristic of the substance in the cavity of the object. The sensor assembly also includes a sensor housing that supports the sensor and that operably engages the connector to support the sensor at least partially in the cavity of the object. The sensor housing defines a longitudinal axis, and the sensor housing includes a first retainer and a second retainer. The first retainer includes a tapered surface that tapers relative to the longitudinal axis, and the tapered surface abuts against the aperture surface of the connector to guide the sensor housing as the sensor housing moves substantially parallel to the longitudinal axis into the aperture. The sensor housing is engageable with the connector to receive the connector between the first retainer and the second retainer and to limit relative movement of the sensor housing and the connector in a direction substantially parallel to the longitudinal axis. The second retainer abuts against the aperture surface of the connector to limit relative rotation of the sensor housing and the connector about the longitudinal axis.

A sensor assembly for detecting a characteristic of a substance in a cavity of an object is also disclosed. The object includes a side wall that defines the cavity. The object includes a connector positioned at the side wall of the object. The connector is chosen from a group consisting of a first connector and a second connector. The first connector has a first aperture providing access into the cavity, and the first aperture defined by a first aperture surface. Also, the first aperture surface includes a recess. The second connector has a second aperture providing access into the cavity. The second aperture is defined by a second aperture surface. Also, the second aperture surface includes a flange. The sensor assembly also includes a sensor that detects the characteristic of the substance in the cavity of the object. Furthermore, the sensor assembly includes a sensor housing that supports the sensor and that removably engages to the first connector or the second connector to support the sensor at least partially in the cavity of the object. The sensor housing defines a longitudinal axis and includes a first retainer and a second retainer. The first retainer includes a second surface that extends transversely away from the longitudinal axis, and the second retainer defines an undercut extending circumferentially about the longitudinal axis. The second surface of the first retainer and the second retainer receive the first connector therebetween to limit relative movement of the sensor housing and the first connector in a direction substantially parallel to the longitudinal axis, and the second retainer is received in the recess and abuts the first aperture surface to limit relative rotation of the sensor housing and the first connector about the longitudinal axis. Also, the undercut receives the flange to limit relative movement of the sensor housing and the second connector in a direction substantially parallel to the longitudinal axis and to limit relative rotation of the sensor housing and the second connector about the longitudinal axis.

Further area of applicability of the present disclosure will become apparent from the detailed description and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

BRIEF DESCRIPTION OF THE DRAWINGS

FIG. 2 is a perspective view of a sensor housing of the sensor assembly of FIG. 1;

FIG. 3 is a perspective view of the sensor housing of FIG. 2;

FIG. 7 is a section view of the sensor assembly of FIG. 6 being installed;

FIG. 8 is a section view of the sensor assembly of FIG. 6 installed;

FIG. 9 is an end view of a connector according to additional embodiments;

FIG. 10 is a perspective view of the connector of FIG. 9;

FIG. 11 is an end view of the sensor assembly being installed using the connector of FIGS. 9 and 10;

FIG. 12 is an end view of the sensor assembly of FIG. 11 installed;

FIG. 13 is a partial section view of the sensor assembly being installed using the connector of FIGS. 9 and 10; and FIG. 14 is a partial section view of the sensor assembly of FIG. 13 installed.

DETAILED DESCRIPTION

Generally, various embodiments of a sensor assembly are disclosed herein. The sensor assembly can include a sensor housing that holds and supports a sensor. The sensor housing also couples and orients the sensor to a side wall of an object, such as a pipe. As such, the sensor housing supports the sensor at least partially within a cavity of the object.

The object can include a connector portion positioned at the side wall of the object, such as an integral boss or a removable portion that includes an aperture providing access into the cavity. Surface(s) defining the aperture can include various raised areas or raised features that can engage the sensor housing. Also, the connector can be either rigid or resiliently flexible.

The sensor housing can include various retainers (i.e., raised features, flanges, walls, etc.) that can engage features of the aperture surface to engage the connector to limit axial and/or rotational movement of the sensor housing relative to the connector such that the sensor remains securely and desirably oriented. Also, the sensor housing can engage either the rigid connector or the resiliently flexible connector. Accordingly, the assembly can be very adaptable.

Additionally, the sensor housing can seal against the connector to reduce the likelihood of leakage from the cavity. Moreover, the assembly can include various indicators that indicate the sensor is desirably oriented relative to the cavity or other reference, such as another portion of the object.

Figure 1:
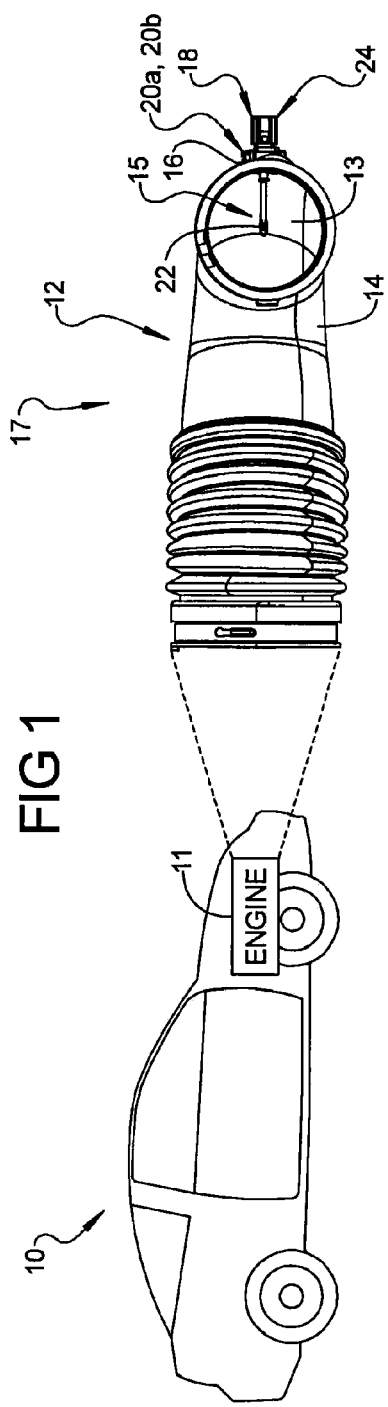
FIG. 1 is a schematic view of a vehicle with a sensor assembly according to various exemplary embodiments of the present disclosure.

Referring initially to FIG. 1, a vehicle 10 is illustrated. Although the vehicle 10 is a car in the embodiment shown, it will be appreciated that the vehicle 10 could be of any suitable type, such as a van, a truck, a sports utility vehicle, etc. without departing from the scope of the present disclosure.

As shown, the vehicle 10 can include an object 17 with a cavity 15 therein. The object 17 can be of any suitable type, such as a manifold, housing, piping system 12, etc. in which a fluid is present and/or flows therein. For instance in one exemplary embodiment, a piping system 12 can be part of an air intake system that directs air flow into an engine 11. However, it will be appreciated that the cavity 15 can contain any substance, including a substance that remains substantially stagnant therein. It will also be appreciated that the piping system 12 can be any suitable system of the vehicle 10 for directing flow of any fluid. Also, the piping system 12 can be operable for any machine other than a vehicle 10 without departing from the scope of the present disclosure.

The piping system 12 can include a pipe 14. The cavity 15 can be a main passageway 13 extending continuously through the pipe 14, and the fluid (e.g., air) can flow through the main passageway 13. Also, the pipe 14 can include an aperture 16 that provides access into the main passageway 13 of the pipe 14. The aperture 16 can extend generally transverse to the main passageway 13.

Moreover, the piping system 12 can include a sensor assembly 18 with a sensor 22. The sensor 22 can be operable to detect a characteristic of a substance of the fluid within the pipe 14. For instance, in some exemplary embodiments, the sensor 22 can detect a temperature of air within the pipe 14, and the sensor 22 can communicate corresponding temperature data to other systems within the vehicle 10 (e.g., to an engine control unit or ECU) to maintain a desired operation of the engine 11. However, it will be appreciated that the sensor 22 can be operable to detect any other characteristic of the fluid within the pipe 14.

Furthermore, the sensor assembly 18 can include a sensor housing 24. The sensor housing 24 can support or hold the sensor 22 and can engage a connector 20a, 20b (e.g., a boss), which is integral, fixed or otherwise removably coupled to the pipe 14. For instance, the sensor housing 24 can engage various raised features of the connector 20a, 20b and/or can be received within recesses areas of the connector 20a, 20b to operably secure to the connector 20a, 20b. Furthermore, the sensor housing 24 can extend into the main passageway 13 of the pipe 14 to support the sensor 22 at least partially in the pipe 14 as will be discussed in greater detail below.

The sensor housing 24 can securely engage the connector 20a, 20b such that the sensor 22 remains properly oriented relative to the pipe 14. The sensor housing 24 can also be configured for installing the sensor 22 in a predetermined orientation relative to the flow of fluid within the pipe 14 or other reference. For instance, the sensor housing 24 can couple to the corresponding connector 20a, 20b simply by pushing the sensor housing 24 into the connector 20a, 20b. Also, in some embodiments, the sensor housing 24 can couple to the connector 20a, 20b simply by pushing and then twisting the sensor housing 24 relative to the connector 20a, 20b as will be discussed in greater detail below.

Initially, the connector 20a, 20b will be discussed. A first connector 20a according to the teachings of the present disclosure is illustrated in detail in FIGS. 9-14. Also, an alternative second connector 20b is illustrated in detail in FIGS. 4-8. Either of the connectors 20a, 20b can be employed for use in the sensor assembly 18. It will also be appreciated that the connector 20a, 20b of the sensor assembly 18 can differ from the illustrated embodiments without departing from the scope of the present disclosure.

Referring now to FIGS. 9-14, the first connector 20a will be discussed in detail. The connector 20a can be a monolithic member made out of a rigid, polymeric material. In some embodiments, the connector 20a can be formed via an injection molding process. The connector 20a can be substantially annular with an aperture 31 extending therethrough. The aperture 31 can be a through-hole and can be defined by an aperture surface 30 (i.e., the inner raised or recessed surfaces of the connector 20a).

The connector 20a can include a first ring 26 and a second ring 28. The first ring 26 can have a base rim surface 27, and the second ring 28 can have an outer rim surface 29. The base rim surface 27 and outer rim surface 29 can be generally parallel to each other and can extend circumferentially about the connector 20a.

Still further, the first connector 20a can include an indicator 32 (FIGS. 9-12). In the embodiments illustrated, the indicator 32 can be a flange of material that extends transversely away from the axis of the first connector 20a. As will be discussed, the indicator 32 can provide a visual cue that the sensor housing 24 is in a predetermined orientation relative to the first connector 20a. It will be appreciated that the indicator 32 can be of any suitable type and can be a visual indicator, a tactile indicator, an audible indicator, etc.

The first connector 20a can also include a ramp 34, which is most clearly seen in FIG. 10. The ramp 34 can be defined on the outer rim surface 29 and can include a ramp surface 33 and a back surface 35. The ramp surface 33 can project progressively away from the outer rim surface 29, for example, in a helical direction, and the ramp surface 33 can terminate at the back surface 35.

Additionally, the first connector 20a can include one or more flanges 36, which are most clearly seen in FIGS. 9 and 10. The flanges 36 project inwardly toward the axis of the connector 20a, adjacent the base rim surface 27. In the embodiment shown, the connector 20a includes two flanges 36 that are spaced apart from each other about the axis of the connector 20a. Also, the flanges 36 can each include a respective outer surface 37 and a respective inner surface 38. Both the outer and inner surfaces 37, 38 can be substantially parallel to the base rim surface 27 and the outer rim surface 29 of the connector 20a. In some embodiments, the flanges 36 can have different arc lengths such that the flanges 36 extend across different angles $\alpha_1, \alpha_2$.

As shown in FIGS. 13 and 14, the first connector 20a can be operably coupled to the pipe 14. The first connector 20a can be coupled to the pipe 14 in any suitable fashion (e.g., plastic welding, adhesives, etc.). Specifically, the base rim surface 27 of the connector 20a can be fixed to the pipe 14 such that the connector 20a lies over a portion of the aperture 16 in the pipe 14 and such that the aperture 31 of the connector 20a is in communication with the aperture 16 of the pipe 14. Accordingly, the aperture 31 of the connector 20a can provide access into the main passageway 13 of the pipe 14.

It will be appreciated that the connector 20a could be coupled to the pipe 14 in any suitable fashion. Moreover, although the connector 20a is shown as being removably attached to the pipe 14, it will be appreciated that the connector 20a could be integrally coupled to the pipe 14 so as to be monolithic therewith.

Referring now to FIGS. 4-8, the second connector 20b will be discussed in greater detail. The second connector 20b can be a monolithic member that is made from a resiliently flexible polymeric material. Also, the second connector 20b can be made through an injection molding process in some embodiments. The second connector 20b can be substantially similar to the first connector 20a except as noted herein.

The second connector 20b can be substantially annular with an aperture 86 extending therethrough. The aperture 86 can be a through-hole and can be defined by an aperture surface 80 (i.e., the inner raised or recessed surfaces of the connector 20b).

The second connector 20b can include a first ring 76 with a base rim surface 77 and a second ring 78 with an outer rim surface 79. The base rim surface 77 and outer rim surface 79 can be generally parallel each other and can extend circumferentially about the connector 20b.

Figure 4:
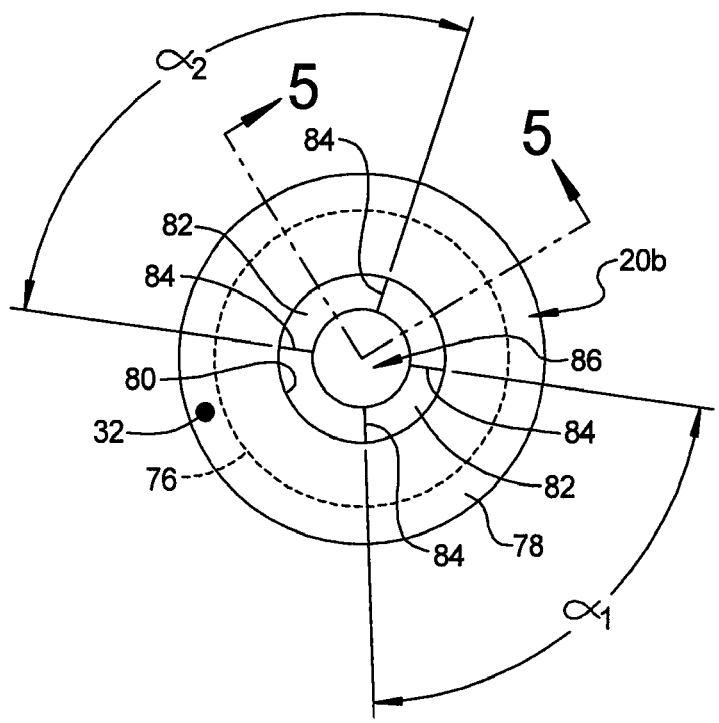
FIG. 4 is an end view of a connector of the sensor assembly of FIG. 1.
Figure 5:
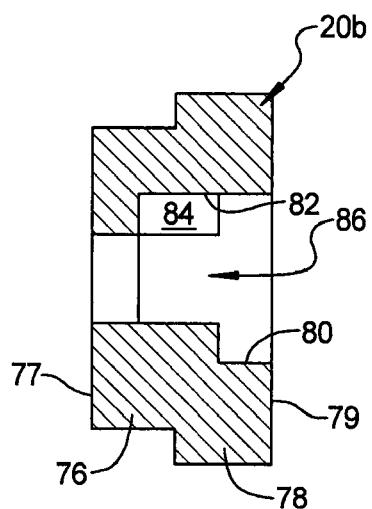
FIG. 5 is a section view taken along the lines 5-5 of FIG. 4.

The aperture surface 80 can include one or more recesses 82 as shown in FIGS. 4 and 5. As shown in FIG. 4, there can be two recesses 82 that are spaced apart from each other. Similar to the embodiments discussed above, the recesses 82 can have different arc lengths so as to extend across different angles $\alpha_1, \alpha_2$. Also, the recesses 82 can be partially defined by respective longitudinal side surfaces 84 (FIGS. 4 and 5).

Also, as shown in FIG. 4, the connector 20b can include an indicator 32 substantially similar to the indicator 32 described above with respect to the embodiments of FIGS. 9-14. In the embodiments of FIG. 4, the indicator 32 can be a printed, painted, or otherwise demarcated indicator 32 included on the outer rim surface 79. As will be discussed, the indicator 32 can be used to indicate that the sensor housing 24 is in the intended orientation relative to the connector 20b or other reference. It will be appreciated that the indicator 32 can be a visual indicator, an audible indicator, a tactile indicator, etc.

Figure 6:
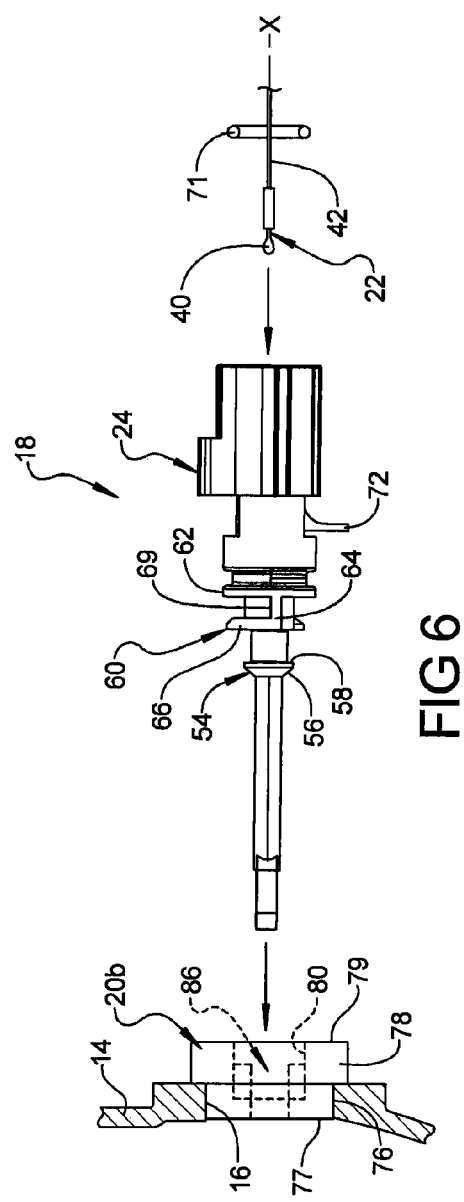
FIG. 6 is an exploded view of the sensor assembly of FIG. 1.

Referring now to FIG. 6, the sensor 22 will be described in greater detail. As shown, the sensor 22 can include a pill 40 and electrical wiring 42 that extends from and that is electrically connected to the pill 40. The sensor 22 can also include an electrical connector (not specifically shown) on an end opposite the pill 40 for quickly and conveniently electrically connecting to an external device (e.g., other wiring, the ECU, etc.). In some embodiments, the sensor 22 can be a 10K thermistor, which is commercially available from SPARK-FUN™ Electronics (SKU #SEN-00250).

Referring now to FIGS. 2 and 3, the sensor housing 24 will be discussed in greater detail. The sensor housing 24 can be a monolithic member made out of a rigid, polymeric material, and the sensor housing 24 can be made in an injection molding or other suitable manufacturing process. As mentioned above, the sensor housing 24 can support the sensor 22. Also, as mentioned, the sensor housing 24 can be operably secured to either the first connector 20a or the second connector 20b, depending on which connector 20a, 20b is connected to the pipe 14.

The sensor housing 24 can include an elongate main body 44 having a first end 46, a second end 48, and a longitudinal axis X. A passageway 50 can extend longitudinally through the housing 24 between the first and second ends 46, 48. Also, the second end 48 can include an opening 52. As shown in FIGS. 7-8, the sensor 22 can extend through the passageway 50 such that the pill 40 of the sensor 22 is fixed to and exposed at the second end 48 and such that the wiring 42 is enclosed within the passageway 50.

Referring back to FIGS. 2 and 3, the sensor housing 24 can also include one or more retainers 54, 60 for operably coupling the sensor housing 24 to the respective connector 20a, 20b. As shown, the sensor housing 24 can include a single first retainer 54 and a plurality (e.g., two) of second retainers 60. In some embodiments, the retainers 54, 60 can be integrally coupled to the main body 44 of the housing 24 so as to be monolithic.

As shown in FIGS. 2 and 3, the first retainer 54 can be annular and can extend continuously about the axis X. The first retainer 54 can include a tapered surface 56 that tapers frusto-conically relative to the axis X. Also, the first retainer 54 can include a second surface 58 that extends radially away from and transverse (e.g., substantially perpendicular) to the axis X.

The second retainers 60 can be spaced apart about the axis X and can each include a first wall 64 and a second wall 66. The first walls 64 can extend substantially parallel to the axis X, and the second walls 66 can extend circumferentially about the axis X substantially perpendicular to the axis X. In some embodiments, the second walls 66 can have different arc lengths that correspond to the different arc lengths of the flanges 36 and/or recesses 82 of the connectors 20a, 20b. Moreover, an annular disc 62 can extend continuously about the axis X. Thus, undercuts 69 can be respectively defined between the disc 62, the first walls 64, and the second walls 66. As such, the undercuts 69 can each extend partially circumferentially about the axis X. Additionally, the second walls 66 can each include a respective tapered ramp 68 on an end opposite the respective first wall 64.

Still further, the sensor housing 24 can include an annular groove 70 that is defined between the disc 62 and the first end 46. As shown in FIGS. 13 and 14, a sealing member 71, such as a resiliently flexible O-ring can be received in and retained within the groove 70.

Additionally, the sensor housing 24 can include a projection 72. The projection 72 can extend transversely from the main body 44 of the housing 24 (e.g., perpendicular to the axis X), adjacent the first end 46. As will be discussed, the rotational position of the projection 72 relative to the indicators 32 of the connectors 20a, 20b can indicate that the sensor housing 24 is at a desired orientation. For instance, as shown in FIG. 12, the projection 72 can substantially align with the indicator 32 of the first connector 20a to confirm that the housing 24 is for a desired orientation relative to the connector 20a. Likewise, the projection 72 can substantially align with the indicator 32 of the second connector 20b for a desired orientation.

Referring now to FIGS. 11-14, attachment of the sensor housing 24 to the first connector 20a will be discussed. It is assumed that the sealing member 71 has already been attached to the sensor housing 24, that the sensor 22 has already been installed in the sensor housing 24, and that the first connector 20a has already been fixed to the pipe 14 (as discussed above).

As shown in FIGS. 11 and 13, the sensor housing 24 can be rotationally oriented about the axis X such that the second retainers 60 are aligned with the spaces between the flanges 36 of the connector 20a. Then, the sensor housing 24 can be moved axially toward the connector 20a such that the second retainers 60 bypass the flanges 36 (FIG. 13) and such that the second end 48 of the sensor housing 24 enters the pipe 14. Movement of the sensor housing 24 in this axial direction can be limited by abutment of the disc 62 of the sensor housing 24 and the respective outer surface 37 of the flanges 36 of the first connector 20a.

Subsequently, as shown in FIGS. 12 and 14, the sensor housing 24 can be rotated about the axis X (in a first direction indicated by an arrow) relative to the first connector 20a such that the undercuts 69 receive the respective flanges 36 of the connector 20a. As shown in FIG. 12, this rotation also causes the projection 72 to slide over the ramp surface 33 and be retained against the back surface 35 of the ramp 34 (see FIGS. 9 and 10).

Once in the position shown in FIGS. 12 and 14, the flanges 36 of the first connector 20a can abut the first walls 64 of the sensor housing 24, and the projection 72 can abut the back surface 35 of the ramp 34 to limit rotation of the sensor housing 24 in both directions relative to the first connector 20a. Furthermore, the flanges 36 can abut the disc 62 of the sensor housing 24 and the second walls 66 of the sensor housing 24 to limit movement of the sensor housing 24 in both axial directions relative to the first connector 20a.

In some embodiments, there can be abutment between each of these respective surfaces such that the sensor housing 24 is substantially fixed rotationally and axially relative to the connector 20a. Thus, the sensor housing 24 can be conveniently and yet securely attached to the connector 20a and the pipe 14.

Various features can ensure that the sensor housing 24 is oriented desirably relative to the object 17 (here a pipe 14) and relative to the direction of fluid flow within the pipe 14. For instance, as discussed above, the flanges 36 of the connector 20a can have different arc lengths and can extend across different angles $\alpha_1$, $\alpha_2$, (FIG. 9), and the arc lengths of the second walls 66 can correspond accordingly. Thus, there can be only one rotational orientation of the sensor housing 24 that would allow the second retainers 60 to bypass the flanges 36 when inserting the second end 48 of the sensor housing 24 axially into the pipe 14. Moreover, as shown in FIG. 12, the projection 72 can substantially align with the indicator 32 when viewed in the axial direction to visually confirm that the housing 24 is rotationally oriented relative to the pipe 14. Accordingly, because this relative orientation can be easily ensured, the sensor 22 is more likely to accurately detect the characteristics of the substance within the pipe 14.

Still further, as shown in FIG. 14, the sealing member 71 can substantially seal against the aperture surface 30 of the connector 20a. As such, the substance within the pipe 14 is unlikely to leak out of the pipe 14 at the sensor assembly.

Referring now to FIGS. 7 and 8, attachment of the sensor housing 24 to the second connector 20b will be discussed. First, the sensor housing 24 can be rotationally oriented about its axis X relative to the connector 20b such that the second retainers 60 are substantially aligned with the respective recesses 82 of the connector 20b when viewed axially. Then, as shown in FIG. 7, the sensor housing 24 can be pushed axially through the aperture 86. As the housing 24 is advanced in this direction, the recesses 82 can each receive a respective second retainer 60. Also, the first retainer 54 can abut the aperture surface 80, and the aperture 86 can resiliently enlarge to allow passage of the first retainer 54. Also, the tapered surface 56 of the first retainer 54 can abut against the aperture surface 80 to thereby guide movement of the sensor housing 24 and keep the sensor housing 24 substantially axially aligned with (i.e., centered relative to) the connector 20b.

As shown in FIG. 8, once the first retainer 54 advances past the base rim surface 77 of the second connector 20b, the second connector 20b can resiliently recover and can be abuttingly retained and received between the first retainer 54 and the second retainer 70 of the sensor housing 24 to limit axial movement of the sensor housing 24 relative to the connector 20b. More specifically, the base rim surface 77 of the second connector 20b can abut the second surface 58 of the first retainer 54, and the second walls 66 of the sensor housing 24 can abut the aperture surface 80 of the second connector 20b between the side surfaces 84. Moreover, the first and second walls 64, 66 of the sensor housing 24 can abut against the respective side surfaces 84 of the second connector 20b to limit rotation of the sensor housing 24 about the axis X in both directions relative to the connector 20b. In some embodiments, there can be very tight abutment between each of these respective surfaces such that the sensor housing 24 is substantially fixed rotationally and axially relative to the second connector 20b. Thus, the sensor housing 24 can be conveniently and yet securely attached to the connector 20b and the pipe 14.

Still further, as shown in FIG. 8, the sealing member 71 can substantially seal against the aperture surface 80 of the connector 20b. As such, the fluid within the pipe 14 is unlikely to leak out of the pipe 14.

Similar to the embodiments of FIGS. 11-14, the orientation of the sensor housing 24 relative to the connector 20b can be ensured due to the arc lengths of the recesses 82 and/or due to the orientation of the projection 72 and a corresponding indicator 32 on the connector 20b. Thus, the sensor 22 is more likely to operate with increased accuracy.

It will also be appreciated that the sensor housing 24 can be relatively versatile. This is because the sensor housing 24 includes various features for attachment to either the first connector 20a or the second connector 20b. In each case, the housing 24 need only be pushed and twisted relative to the connector 20a, 20b, and the orientation of the sensor 22 can be ensured. Thus, for instance, if the first connector 20a is rigid and the second connector 20b is resiliently flexible, their use may be determined by the temperature of the substance within the pipe 14. If the substance has a relatively high temperature, then the first connector 20a can be employed, but if the substance has a relatively low temperature, then the second connector 20b can be employed. In either case, the same sensor housing 24 can be used to support the sensor 22 within the pipe 14.

The above description is merely exemplary in nature and, thus, variations of the above description are intended to be within the scope of the present disclosure. Such variations are not to be regarded as a departure from the spirit and scope of the present disclosure.

What is claimed is:

1. A sensor assembly for detecting a characteristic of a substance in a pipe, the pipe including a pipe connector with an inlet surface and defining an aperture that provides access into the pipe, the sensor assembly comprising:
   a sensor that detects the characteristic of the substance in the pipe; and a sensor housing that is fixed for movement with the sensor and that engages the pipe connector to support the sensor at least partially in the pipe, the sensor housing defining a longitudinal axis and including a first retainer having a tapered surface that tapers relative to the longitudinal axis and a second surface extending substantially perpendicular to the longitudinal axis and a second retainer having at least one channel formed by a first wall extending circumferentially about the longitudinal axis and opposing the second surface of the first retainer and a second wall extending from the first wall and substantially parallel to the longitudinal axis, the tapered surface abutting against the inlet surface of the pipe connector to guide the sensor housing as the sensor housing moves substantially parallel to and rotates about the longitudinal axis within the aperture, the sensor housing engageable with the pipe connector to abuttingly retain the pipe connector between the second surface of the first retainer and the first wall of the second retainer to limit movement of the sensor housing in a direction substantially parallel to the longitudinal axis, the second retainer abutting against the inlet surface of the pipe connector to limit rotation of the sensor housing about the longitudinal axis.

2. The sensor assembly of claim 1, wherein the first retainer is generally annular and continuously extends about the longitudinal axis.

3. The sensor assembly of claim 1, wherein the second surface abuts an inner surface of the pipe connector to retain the pipe connector between the second surface and the second retainer to limit movement of the sensor housing in a direction substantially parallel to the longitudinal axis.

4. The sensor assembly of claim 1, wherein the sensor housing includes a main body, and wherein the first retainer and the second retainer are each integrally coupled to the main body so as to be monolithic.

5. The sensor assembly of claim 1, further comprising the pipe connector.

6. The sensor assembly of claim 5, wherein the pipe connector is resiliently flexible, the aperture having a width that is resiliently variable to allow passage of the first retainer.

7. The sensor assembly of claim 5, wherein the inlet surface defines a recess that receives the second retainer.

8. The sensor assembly of claim 5, wherein the sensor housing further includes a projection that extends transversely away from the longitudinal axis, the pipe connector including an indicator, the projection orientatable relative to the indicator to indicate a predetermined rotational orientation of the sensor housing about the longitudinal axis relative to the pipe connector.

9. The sensor assembly of claim 1, wherein the sensor housing further comprises a sealing member that seals against the inlet surface.

10. The sensor assembly of claim 1, wherein the sensor is a temperature sensor that detects a temperature of the substance inside the pipe.

11. A sensor assembly for detecting a characteristic of a substance in a pipe, the sensor assembly comprising:
a pipe connector that is fixed to the pipe and includes an inlet surface having a flange and an aperture providing access into the pipe;
a sensor that detects the characteristic of the substance in the pipe; and
a sensor housing that is fixed for movement with the sensor and that removably engages the pipe connector to support the sensor at least partially in the pipe, the sensor housing defining a longitudinal axis and including a first retainer having a tapered surface that tapers relative to the longitudinal axis and a second surface extending substantially perpendicular to the longitudinal axis and a second retainer having at least one channel formed by a first wall extending circumferentially about the longitudinal axis and opposing the second surface of the first retainer and a second wall extending from the first wall and substantially parallel to the longitudinal axis, the channel receiving the flange of the pipe connector therein when the sensor housing is rotated relative to and within the pipe connector and providing a rotational stop when the flange of the pipe connector engages the second wall.

12. The sensor assembly of claim 11, wherein the sensor housing further includes a projection that extends radially away from the longitudinal axis, and wherein the inlet surface of the pipe connector includes a ramp with a back surface and wherein the projection abuts against the back surface to limit rotation of the sensor housing about the longitudinal axis.

13. The sensor assembly of claim 12, wherein the pipe connector includes an indicator, the projection operable to be positioned relative to the indicator to indicate a predetermined rotational orientation of the sensor housing about the longitudinal axis relative to the pipe connector.

14. The sensor assembly of claim 11, wherein the first retainer is generally annular and continuously extends about the longitudinal axis.

15. The sensor assembly of claim 11, wherein the sensor housing includes a main body, and wherein the first retainer and the second retainer are each integrally coupled to the main body so as to be monolithic.

16. The sensor assembly of claim 11, wherein the sensor housing further comprises a sealing member that seals against the inlet surface of the pipe connector.

17. The sensor assembly of claim 11, wherein the second retainer includes a disc that extends continuously about the longitudinal axis, the channel being defined by the first wall, the second wall, and the disc.

18. The sensor assembly of claim 11, wherein the sensor is a temperature sensor that detects a temperature of the substance inside the pipe.

* * * * *